United States Patent [19]

Schmidt et al.

[11] 4,215,899
[45] Aug. 5, 1980

[54] CABIN FOR TRUCKS WITH TRAILER-FIXTURES

[75] Inventors: Werner Schmidt; Gerhard Watzek, both of Munich, Fed. Rep. of Germany

[73] Assignee: Maschinenfabrik Augsburg-Nurnberg Aktiengesellschaft, Munich, Fed. Rep. of Germany

[21] Appl. No.: 937,457

[22] Filed: Aug. 28, 1978

[30] Foreign Application Priority Data

Sep. 1, 1977 [DE] Fed. Rep. of Germany ....... 2739415

[51] Int. Cl.² .............................................. B62D 27/00
[52] U.S. Cl. ...................................... 296/190; 5/118; 105/316
[58] Field of Search ................ 296/190, 169; 5/118, 5/8, 9; 105/316, 317, 318, 319; 108/111

[56] References Cited

U.S. PATENT DOCUMENTS

| | | | |
|---|---|---|---|
| 3,353,861 | 11/1967 | Froitzheim | 296/24 |
| 3,588,168 | 6/1971 | Froitzheim | 296/190 |
| 3,612,599 | 10/1971 | Sternberg | 5/118 |
| 3,879,081 | 4/1975 | Hockley | 296/190 |
| 4,054,956 | 10/1977 | Quakenbush | 5/9 R |

FOREIGN PATENT DOCUMENTS 2640895 3/1977 Fed. Rep. of Germany .
2617941 10/1977 Fed. Rep. of Germany .
132252 1/1921 United Kingdom .

*Primary Examiner*—Robert R. Song
*Attorney, Agent, or Firm*—Haseltine, Lake & Waters

[57] ABSTRACT

In a cabin for trucks with trailer-fixtures, a first sleeping-berth is arranged behind and between the seats on the rear wall of the cabin pivotally about a horizontal pin. A second sleeping-berth is provided, that is conveyable from an operational position next to the first sleeping-berth to a horizontal storing position above the first sleeping-berth. A linkage for moving the second berth comprises two cantilevers that are pivotally fixed to the cabin about a horizontal pin and hold the second sleeping-berth at the lateral sides thereof.

14 Claims, 2 Drawing Figures

CABIN FOR TRUCKS WITH TRAILER-FIXTURES

BACKGROUND OF THE INVENTION

The present invention relates to a truck cabin in which trailer-fixtures are behind the seats and a first sleeping-berth is situated on the rear wall of the truck at about half the height thereof.

Trucks with cabins made in this manner are to be used in long-distance-travel, when a truck is often underway for a week or longer, and when the driver and/or drivers cannot rely on public service facilities, because they either do not exist, or as a rule are not available at such time as they are needed. With trailer-fixtures in the cabin, as, for example, closets for provisions and clothes, cooking and washing facilities, the drivers can travel their route totally independent of public service stations.

The disadvantage of the above-mentioned trailer-fixtures is that they take up the space behind the driver's seat, in which a lower sleeping-berth was arranged in the conventional cabins, so that there is only room for one sleeping-berth in the space behind the driver's seats, namely above the trailer fixtures situated there. The advantage of independence from public service stations is gained with the disadvantage, that at any one time, only one of both drivers can sleep.

SUMMARY OF THE INVENTION

The main object of the present invention is to overcome the defects of the prior art.

Another object of the present invention is to provide a cabin in which provision is made for sleeping-berths for both drivers, whereby both sleeping-berths are capable of storage when not in use, so that neither the comfort of the driver while actually driving or while using the remaining trailer-fixtures will be impaired.

It is a particular object of this invention to provide a second sleeping-berth and a lift-apparatus by which it is conveyable from an operational position next to the first sleeping-berth to a horizontal storage position above the first sleeping-berth at the ceiling of the cabin.

The principal feature of the invention relates to the fact that when both sleeping-berths are in use, neither the driver nor the passenger seat will be used, so that it is safe, if the second sleeping-berth is in front of the first sleeping-berth hinged on the rear wall of the cabin, and above the driver's and/or passenger's seat. The backs of both seats can be lowered towards the front, if they are in the way, in order to make room for the second sleeping-berth. This side-by-side arragement of both the sleeping-berth provides a relatively large amount of head room above the sleeping-berths, that is even greater than that of the conventional design, in which two sleeping-berths are arranged one above the other in the space behind the seats. A particular advantage is the storing position of the second sleeping-berth above the first at the ceiling of the cabin, because in that position the sleeping-berth in no way takes up the space used by the drivers and it particularly does not hinder use of the first sleeping-berth in any way.

A further feature of the present invention is the lift-apparatus consisting of two cantilevers that are fixed pivotally about a horizontal hinge pin parallel to the rear wall of the cabin and which hold the sleeping-berth hinged at the head and foot. The main advantage of this lift-apparatus resides in the fact that no additional fixtures or devices must be provided in the space taken up by the driver's seats, but the hinges in the cabin side for the lift-apparatus can be arranged on the rear wall of the cabin underneath the first sleeping-berth situated in an operational position.

The invention also provides for a weight-balancing mechanism comprising a torsion-bar spring arranged within the vicinity of the axis of rotation of the cantilevers. This torsion-bar spring can extend over the entire cabin width, so that adequate length is provided for the pivot angle of the cantilever, which amounts to about 70°. A further advantage is that utilization of a torsion-bar spring requires the least amount of space.

In a preferred embodiment of the present invention, the second sleeping-berth, is secured to the cantilevers by means of a catch and a spring. This construction has the advantage that the catch point can be selected in such a manner that the berth, in moving to the storage position, arrives at the ceiling of the cabin, i.e. parallel to the respective ceiling part, so that the berth does not contact the inner surface of the ceiling with its corners or edges.

In a further arrangement of the present invention, a device for stopping the berth is provided having mounting supports arranged on the sidewalls in the operational and storing positions, engaging a cotter pins arranged on the berth side. Preferably the cotter pins are spring-loaded and are released by a cable line. Although devices for stopping are known by those skilled in the art and could be used as stopping devices for the berth, the stopping device employed in the present invention is better suited because the cotter pins are arranged chiefly on the rear edge of the second berth. The operation of the stopping device must be effected from the front edge of the berth, which is particularly easy to accomplish with a cable line that leads through the berth and can be reversed without difficulty.

The invention will be better understood with respect to the accompanying specification, claims and drawings.

DESCRIPTION OF THE INVENTION

Figure 1:
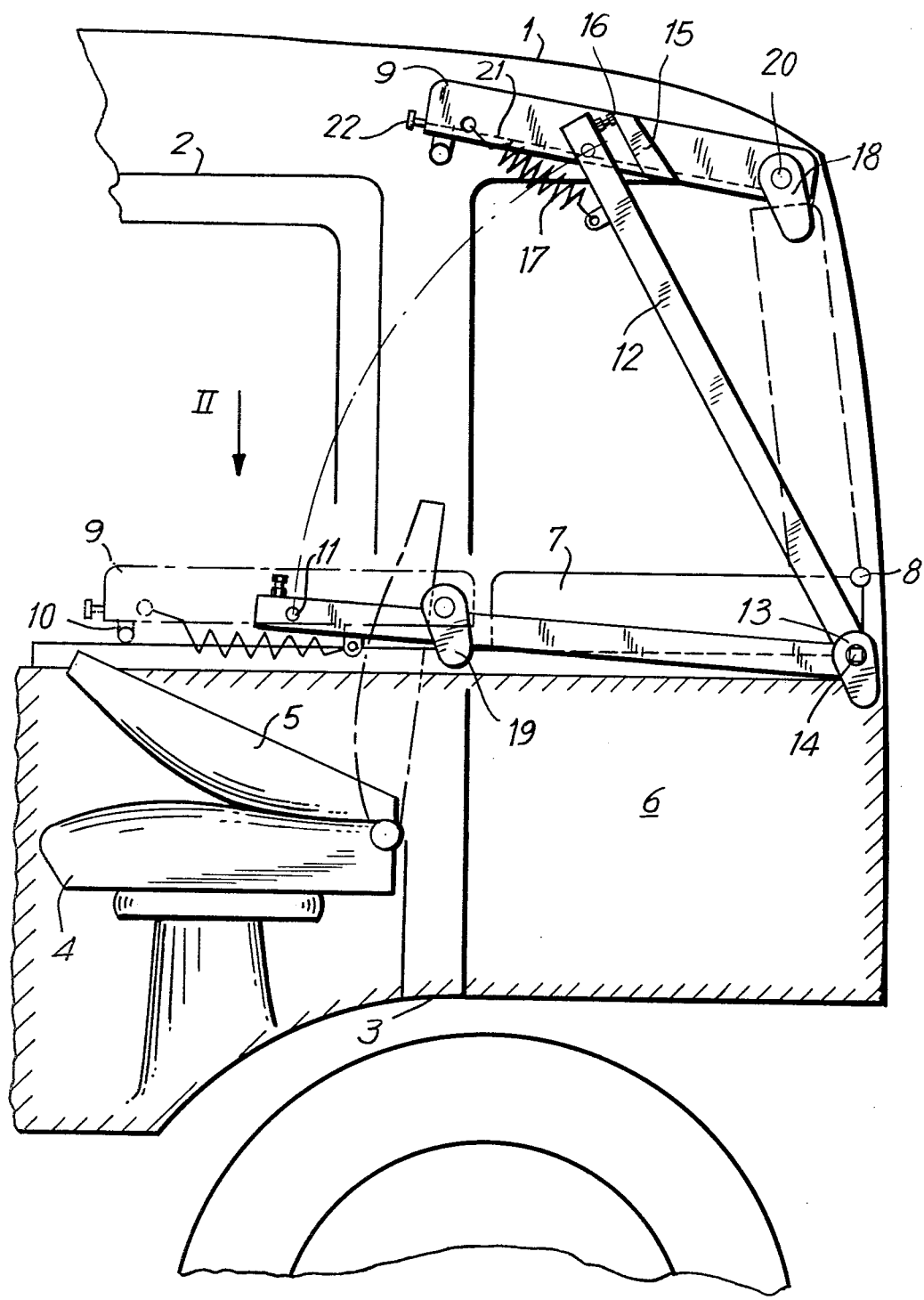
FIG. 1 illustrates a cabin, a portion of which is shown in a cross-sectional view, and in FIG. 2 shows a top view of the second sleeping-berth corresponding to directional arrow II as shown in FIG. 1.

In FIG. 1, an outline of a truck cabin is designated 1. To illustrate the relative sizes, a portion of the cabin door 2 and the cabin floor 3 is indicated. A driver and/or passenger seat 4 is shown in profile. This seat consists of a tilting back rest 5, which can be tilted forward to such position indicated by a solid line from the operational position shown in dotted lines. Trailer fixtures 6 are provided in the space between the vehicle seats and behind the seats up to the rear wall of the cabin, having an outline indicated by border shading. A first sleeping-berth 7 is arranged above the trailer fixtures 6, that reach to about half the available height in the cabin, that can swing up on a horizontal hinge 8 running along the wall of the cabin from the operational position indicated by a solid line to a vertical storing position (dotted lines) on the free portion of the rear wall of the cabin. Next to the first sleeping-berth 7 is a second sleeping-berth 9 arranged in front of the first sleeping-berth 7. The sleeping-berth 9 rests on the trailer-fixture 6 by a rod 10 arranged on its front edge on the underside, that also serves as a handle. The second sleeping-berth 9 is connected in the cabin by suitable linkage members for movement between a lowered operative position next to berth 7 and a raised storage position beneath the ceiling. In this regard, the second sleeping-berth 9 has swivel pivots 11 at the lateral sides and which are engaged by the foremost ends of cantilevers 12 extending at the cabin side walls. The swivel pivots 11 are mounted approximately in the middle of sleeping-berth 9. The rearward ends of both cantilevers 12 are hinged on supports 13 in the area of the rear wall of the truck under the first sleeping-berth 7. Torsion-bar springs 14 are connected to cantilevers 12 and serve as a weight-balance, so that it is possible to tilt up the second sleeping-berth 9 from its operational position next to the first sleeping-berth 7, represented by dotted lines, to its storing position at the ceiling of the cabin without physical stress. The swivel pivots 11 of the second sleeping-berth 9 follow the path indicated in the drawings by a dotted line. In order to prevent the sleeping-berth 9 that swivels about the swivel-pivot 11 in the cantilevers 12, from pushing into the top frame of the cabin at its rear edge, catches 15 are provided at the lateral sides of the sleeping-berth 9, that contact adjustment screws 16 on the cantilevers 12. The sleeping-berth 9 is pivoted to cantilevers 12 by springs 17, which are attached in the area of the foremost edge of the sleeping-berth 9 and to the cantilevers 12, so that the catches 15 contact the levelling screws 16. This position corresponds to a parallel position to the cabin ceiling, as indicated by solid lines in the drawing. In order to be able to lock the cabin berth 9 in the storing position as well as its operational position, mounting supports 18, 19 are arranged in both positions (operational and storing) on the wall side of the cabin, that have drill holes in which are engaged cotter pins 20 arranged on the berth side. The cotter pins 20 are spring-loaded and disengageable by means of a cable line control 21. The cable line control 21 leads from the rear edge of the second sleeping-berth 9 to its foremost edge, where a grip 22 is provided to unlatch the cotter pins 20.

Figure 2:
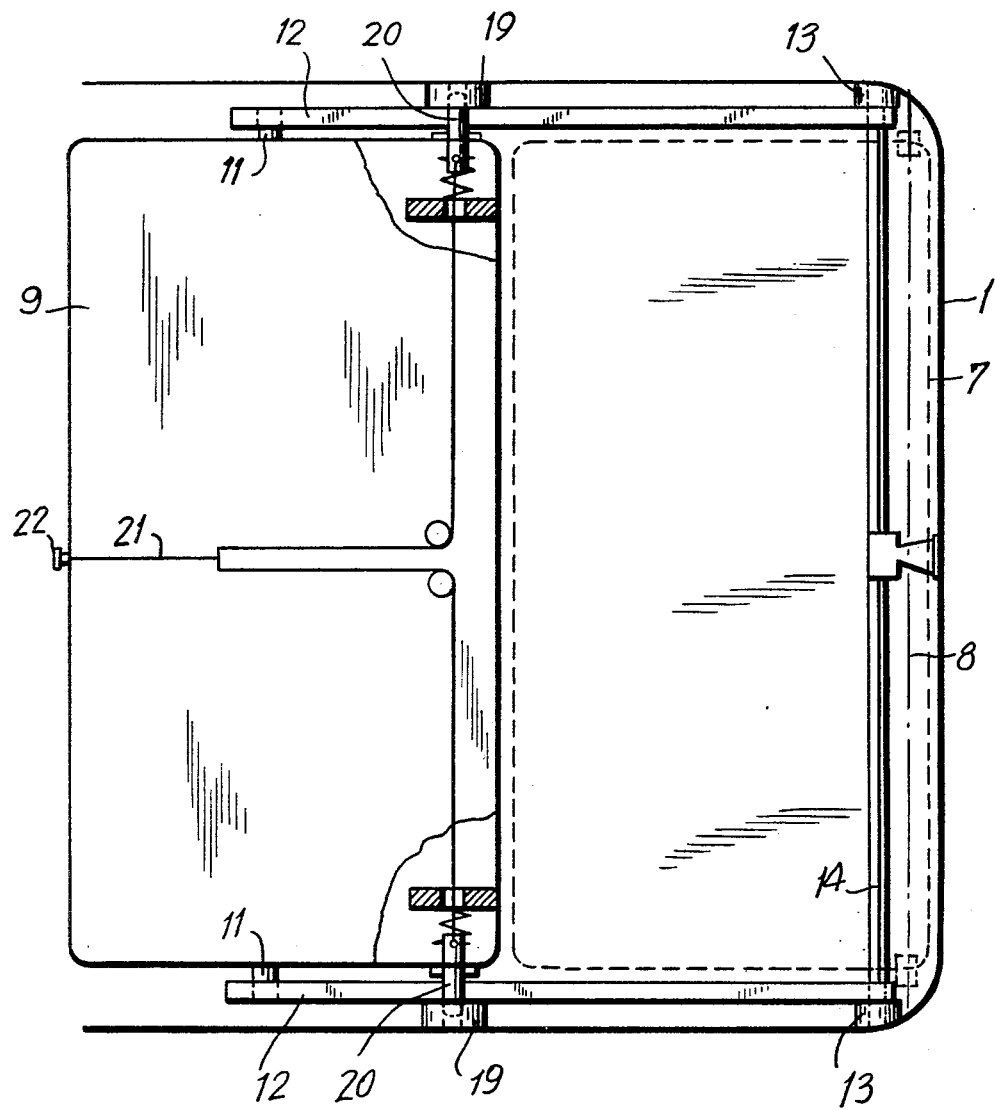

The top view of the second sleeping-berth 9 shown in FIG. 2 is a simplified representation that is merely intended to show the storage of the sleeping-berth 9 on the cantilevers 12 and its locking mechanism by means of cotter pins 20. Mounting supports 19 with drill holes are arranged on both side walls of the cabin, that align the sleeping berth 9 tilting downward with the cotter pins 20, so that the cotter pins 20 can snap into these drill holes. Release of the cotter pins 20 occurs as the grip 22 is pulled thereby pulling the cable line 21. The cable line 21 is divided into two load cables, that run over guide pulleys and are secured to the cotter pins 20. The first sleeping-berth 7 is only shown in dotted outline in FIG. 2. The swivel pivot 8 of the first sleeping-berth 7 is only shown diagrammatically in dotted lines.

It will be appreciated that various changes and modifications may be made in the foregoing apparatus without departing from the spirit of the present invention and as many changes may be made in the embodiments herein set forth, it being understood that all matter described herein is to be interpreted as illustrative and not in a limiting sense.

We claim:

1. A cabin for a trailer truck having a ceiling, a rear wall, seats, and a first sleeping berth behind the seats at a level about midway of the height of the rear walls, said cabin comprising a second berth separate from and independent of the first berth and having an operative position at the level of the first berth to form adjacent first and second sleeping surfaces and a substantially horizontal storage position raised above the first berth adjacent the ceiling in substantially same attitude as in the operative position, and linkage means supporting said second berth in said cabin for movement of said second berth between said operative and storage positions.

2. A cabin as claimed in claim 1 wherein said linkage means moves said second berth between said positions in substantially horizontal attitude.

3. A cabin as claimed in claim 1 wherein said linkage means comprises two cantilever members pivotably connected to said second berth at the lateral sides thereof, and means supporting said cantilever members in said cabin for pivotal movement.

4. A cabin as claimed in claim 3 wherein said means supporting the cantilever members comprises a hinge means about which said cantilever members can pivot.

5. A cabin as claimed in claim 4 wherein said hinge means provides a substantially horizontal pivot axis at said rear wall.

6. A cabin as claimed in claim 3 wherein said linkage means further comprises a weight balancing means for lifting of the second berth.

7. A cabin as claimed in claim 6 wherein said weight balancing means comprises a torsion bar supporting said cantilever members for pivotal movement thereof.

8. A cabin as claimed in claims 1 or 3 comprising releasable locking means for locking said second berth in said operative and storage positions.

9. A cabin as claimed in claim 8 wherein said locking means comprises displaceable engaging means in said berth for selectively being engaged and disengaged in said cabin, cable means connected to said engaging means to displace the same between engaged and disengaged positions, and actuator means for operating the cable means.

10. A cabin as claimed in claim 9 wherein said actuator means is disposed in proximity to said second berth.

11. A cabin as claimed in claims 1 or 3 comprising stop means for halting the second berth in said storage position.

12. A cabin as claimed in claim 11 wherein said stop means comprises a first stop member secured to one of said cantilever members and a second stop member secured to said second berth for contacting the first stop member when the second berth reaches said storage position.

13. A cabin as claimed in claim 12 wherein one of said stop members is adjustable.

14. A cabin as claimed in claim 3 comprising a spring connected to said second berth and one of said cantilever members.

* * * * *